US007769814B2

(12) United States Patent
Wu

(10) Patent No.: US 7,769,814 B2
(45) Date of Patent: Aug. 3, 2010

(54) MESSAGE NOTICE REPLY SYSTEM AND METHOD THEREOF

(76) Inventor: Chao-Hung Wu, No. 25, Alley 8, Lane 63, WuFong Rd., Sindian City, Taipei County (TW)

( * ) Notice: Subject to any disclaimer, the term of this patent is extended or adjusted under 35 U.S.C. 154(b) by 222 days.

(21) Appl. No.: 12/081,665

(22) Filed: Apr. 21, 2008

(65) Prior Publication Data

US 2009/0265433 A1 Oct. 22, 2009

(51) Int. Cl.
*G06F 15/16* (2006.01)

(52) U.S. Cl. ........................ 709/206; 709/204; 709/207

(58) Field of Classification Search ....................... None
See application file for complete search history.

(56) References Cited

U.S. PATENT DOCUMENTS 7,475,114 B2 * 1/2009 Lipton et al. ................ 709/206
2002/0120689 A1 * 8/2002 Kang et al. ................. 709/206
2008/0243641 A1 * 10/2008 Leno ........................... 705/27
2009/0149166 A1 * 6/2009 Habib et al. ............. 455/414.3

* cited by examiner

*Primary Examiner*—John B. Walsh

(57) ABSTRACT

A message notice reply system and a method thereof are disclosed. A message reply scheme functioning a deadline, address and verification for replying is introduced into an electronic mail system. As a sender transmits the message, a message-to-reply field will be incorporated to the message, and a reply field will be added after the recipient opens it. More, a reminder, which can be configured to send to a mobile phone or telephone via VoIP connection, will be launched before the deadline. The reply field won't be checked until the recipient replies the message. As well, the message-to-reply field won't be checked until the sender receives the reply. Further, a multimedia apparatus and a handwriting device are utilized to transmit a multimedia message from the sender and reply from the recipient. The invention is applied to substitute the conventional appointment between people that can not trace the schedule precisely.

54 Claims, 15 Drawing Sheets

| Sender's mail sending area | | | | | | | Sender's mail receiving area | | | | |
|---|---|---|---|---|---|---|---|---|---|---|---|
| Complete | Item | Date | Receiver | Subject (Re) | Way to send | Reply Deadline | Item | Reply date | Respondent | Subject (Re) | Reply method |
| ☑ | 1 | 1/3 | A | Job | Audio/video | 1/10 | 1 | 1/8 | B | Re:Job | Audio/video |
| ☐ | 2 | 2/1 | A | Notice | Audio/video handwriting document | 2/5 | 2 | | | | |
| ☑ | 3 | 3/4 | CDEF | Announce | Text mail | 3/5 | 3 | 3/5 | C | Re:Announce | Mail |
| ☐ | 4 | | | | | | 3 | 3/5 | D | Re:Announce | Mail |
| ☐ | 5 | | | | | | 3 | 3/5 | E | Re:Announce | Mail |
| ☐ | 6 | | | | | | 3 | 3/5 | F | Re:Announce | Mail |

Creating Methods:

- ☐ Scanned document + Audio/video + Handwriting
- ☐ Retrieved screen + Audio/vide + Handwriting
- ☐ Text mail
- ☐ Audio/video
- ☐ Audio/video + Handwriting
- ☐ Handwriting mail
- ☐ Captured scanned documents + Audio/video + Handwriting
- ☐ Successive retrieved screens + Audio/video + Handwriting 20 22 201 205 203 207 209

| Sender's mail sending area | | | | | | | Sender's mail receiving area | | | | |
|---|---|---|---|---|---|---|---|---|---|---|---|
| Complete | Item | Date | Receiver | Subject (Re) | Way to send | Reply Deadline | Item | Reply date | Respondent | Subject (Re) | Reply method |
| ☑ | 1 | 1/3 | A | Job | Audio/video | 1/10 | 1 | 1/8 | B | Re:Job | Audio/video |
| ☐ | 2 | 2/1 | A | Notice | Audio/video handwriting document | 2/5 | 2 | | | | |
| ☑ | 3 | 3/4 | CDEF | Announce | Text mail | 3/5 | 3 | 3/5 | C | Re:Announce | Mail |
| ☐ | 4 | | | | | | 3 | 3/5 | D | Re:Announce | Mail |
| ☐ | 5 | | | | | | 3 | 3/5 | E | Re:Announce | Mail |
| ☐ | 6 | | | | | | 3 | 3/5 | F | Re:Announce | Mail |

Creating Methods:

- ☐ Scanned document + Audio/video + Handwriting
- ☐ Retrieved screen + Audio/vide + Handwriting
- ☐ Text mail
- ☐ Audio/video
- ☐ Audio/video + Handwriting
- ☐ Handwriting mail
- ☐ Captured scanned documents + Audio/video + Handwriting
- ☐ Successive retrieved screens + Audio/video + Handwriting

FIG. 2A 211 24 26 215

| Recipient's mail sending area | | | | | | | Recipient's mail receiving area | | | | |
|---|---|---|---|---|---|---|---|---|---|---|---|
| Complete | Item | Date | message sender | Subject (Re) | Way to send | Reply Deadline | Item | Reply date | Respondent | Subject (Re) | Reply method |
| ☐ | 1 | 1/3 | A | Job | Audio/video | 1/10 | 1 | 1/8 | B | Re:Job | Audio/video |
| ☐ | 2 | 2/1 | A | Notice | Audio/video handwriting document | 2/5 | 2 | | | | |
| ☐ | 3 | 2/3 | C | Notice | Text mail | 2/7 | 3 | 2/3 | B | Re:Notice | Scanned Document |
| ☐ | 4 | | | | | | | | | | |
| ☐ | 5 | | | | | | | | | | |

213 217

Creating Methods:

- ☐ Scanned document + Audio/video + Handwriting
- ☐ Retrieved screen + Audio/vide + Handwriting
- ☐ Text mail
- ☐ Audio/video
- ☐ Audio/video + Handwriting
- ☐ Handwriting mail
- ☐ Captured scanned documents + Audio/video + Handwriting
- ☐ Successive retrieved screens + Audio/video + Handwriting

| Group | Item | Name | Company | Department | Job Title | E-mail Address | Option | Sent to |
|---|---|---|---|---|---|---|---|---|
| ⊞ A | 1 | A | | | | a@abc.com | ☑ | ☑ A |
| ⊞ B | 2 | B | | | | b@abc.com | ☑ | ☑ B |
| ⊟ C | 3 | C | | | | c@def.com | ☐ | |
| —C1 | 4 | D | | | | d@def.com | ☐ | |
| —C2 | 5 | | | | | | ☐ | |
| | 6 | | | | | | ☐ | |
| | 7 | | | | | | ☐ | |
| | 8 | | | | | | ☐ | |
| | 9 | | | | | | ☐ | |
| | 10 | | | | | | ☐ | |
| | | | | | | | ☐ | |
| | | | | | | | ☐ | |

Confirm Cancel ☐ This message should be replied within [ ▿] days [ ▿] hours

MESSAGE NOTICE REPLY SYSTEM AND METHOD THEREOF

BACKGROUND OF THE INVENTION

1. Field of the Invention

The present invention relates to a message notice reply system and a method thereof, and more particularly to a message reply scheme introduced in a message transmitting system to achieve the message reply and tracking effects after a job is dispatched.

2. Description of Related Art

In general, supervisors in a company usually deliver a job to their subordinates by transmitting messages through verbal expressions, written memos or emails. However, busy subordinates may neglect the job delivered by their supervisor easily in the aforementioned method of dispatching jobs. Some supervisors may forget the job that they dispatch. Some supervisors are not sure whether or not their message is delivered properly, and some worry whether or not the job is done properly. Subordinates may forget or delay the job.

The traditional way of using e-mail for transmitting messages to remind an opposite party about some matters such as a sender specifies a "receipt request" function to request the recipient of an email when the sender sends the email to the recipient to assure that the recipient has actually received the email. The sender uses a mail user agent (MUA) to transmit an email through a mail transfer agent (MTA), wherein a receipt request command is bundled with the email, such that if the recipient uses the mail user agent (MUA) such as Outlook and Mozilla Thunderbird to open the mail, then a pop-up window can be used to notice the recipient whether or not to reply the e-mail.

The sender can further use e-mail software to generate a message notice, and sent the message notice in the form of an e-mail to the recipient, and the e-mail software used by the recipient produces an event of the calendar, so as to achieve the aforementioned purpose of delivering a job.

In addition to the traditional way of delivering a job as described in the prior art or using an improved prior art email function to provide an interactive way of delivering a job, the present invention further provides a message notice reply system and its method related to a message reply scheme for actively providing a reminder, and also creates a mail content including voice, image or handwriting content to give a more convenient and efficient message notice reply effect.

SUMMARY OF THE INVENTION

In view of most job deliveries between people are done orally in person or through telephone, and the progress of the delivered job cannot be traced even if an e-mail or a mobile phone message is used for the same purpose, the present invention provides a message notice reply system and a method thereof, adding a message reply scheme to a general mail system, such that both sender and recipient can monitor the statues of processing and replying each mail, and also provide a message reminder function to assure that the mail recipients can execute the delivery job.

The message notice reply system of the invention comprises message sending means, waiting-to-reply means, message receiving means, a reply reminding means, replying means and acknowledge means.

When the message sending means of the message agent sends a message in accordance with a preferred embodiment of the invention, a message reply control entry is added to the message. If the message is sent via an e-mail, then the mail user agent (MUA) connects to an outgoing mail server and transmits the e-mail to a receiving end after the sender is verified, and the message can be a text, a scanned document or a file including an audio/video document produced by an audio/video retrieving apparatus and attached to the message and a dynamic description produced by a handwriting system and recorded. Before sending the message, the waiting-to-reply means sets a time to reply the message, and after sending the message, the message agent adds a wait-to-reply field, and there are no particular limitations on the date, time, or recipient. If the recipient uses the message agent to receive the message sent by an e-mail, then the mail user agent (MUA) will connect to an incoming mail server, and the e-mail will be received after the recipient is verified. After the reply reminding means analyzes the received message content by the message agent, the message is recorded in the message agent and a reply reminder field is added, and different forms of repeated reminders can be performed to the recipient with a specific deadline. If the recipient completes the job delivered by the sender or needs to reply to the sender, then the recipient will select a desired reply message, and use the message agent to send a reply message, wherein the message reply control entry is still attached, and the reply reminder field is recorded to show the completion of the reply, and the reply message can be a text, a scanned document, or a file including an audio/video document produced by an audio/video retrieving apparatus and attached to the message and a dynamic description produced by a handwriting system and recorded. After the sender has received a reply message from the recipient and analyzed the message, the replying means records the message reply control entry information, and records the wait-to-reply field previously added by the message agent.

The message notice reply method of the invention comprises a message sending procedure and a message receiving procedure.

The message sending procedure comprises the step of starting a message agent to connect an outgoing mail server, adding a message reply control entry to a message created by a sender, transmitting the message to a recipient through the outgoing mail server, using the message agent to file a backup copy, and adding one or more wait-to-reply fields.

The message receiving procedure comprises the steps of connecting the incoming mail server to receive a message, analyzing the content of the message, filing the message, adding a reply reminder field. Then, a message reply procedure is carried out. The message reply procedure comprises the steps of connecting an outgoing mail server to send a reply message, and records the reply reminder field. Finally, an acknowledge procedure comprises connecting an incoming mail server to receive the reply message, analyzing the reply message, and then recording the wait-to-reply field.

To make it easier for our examiner to understand the expected objectives, technical measures and effects of the present invention, we use preferred embodiments together with the attached drawings for the detailed description of the invention, but it should be pointed out that the attached drawings are provided for reference and description but not for limiting the present invention.

BRIEF DESCRIPTION OF THE DRAWINGS

FIG. 2A shows a screen of a sender end of a message notice reply system in accordance with the present invention;

FIG. 2B shows a screen of a recipient end of a message notice reply system in accordance with the present invention;

FIG. 2D shows a directory used by a message agent in accordance with a preferred embodiment of the present invention;

DETAILED DESCRIPTION OF THE PREFERRED EMBODIMENTS

The present invention is described in details by preferred embodiments together with attached drawings as follows:

The invention provides a message notice reply system and a method thereof, wherein a message reply scheme is introduced into an e-mail system to replace the traditional job delivery between people that cannot trace its progress or schedule effectively.

Figure 1:
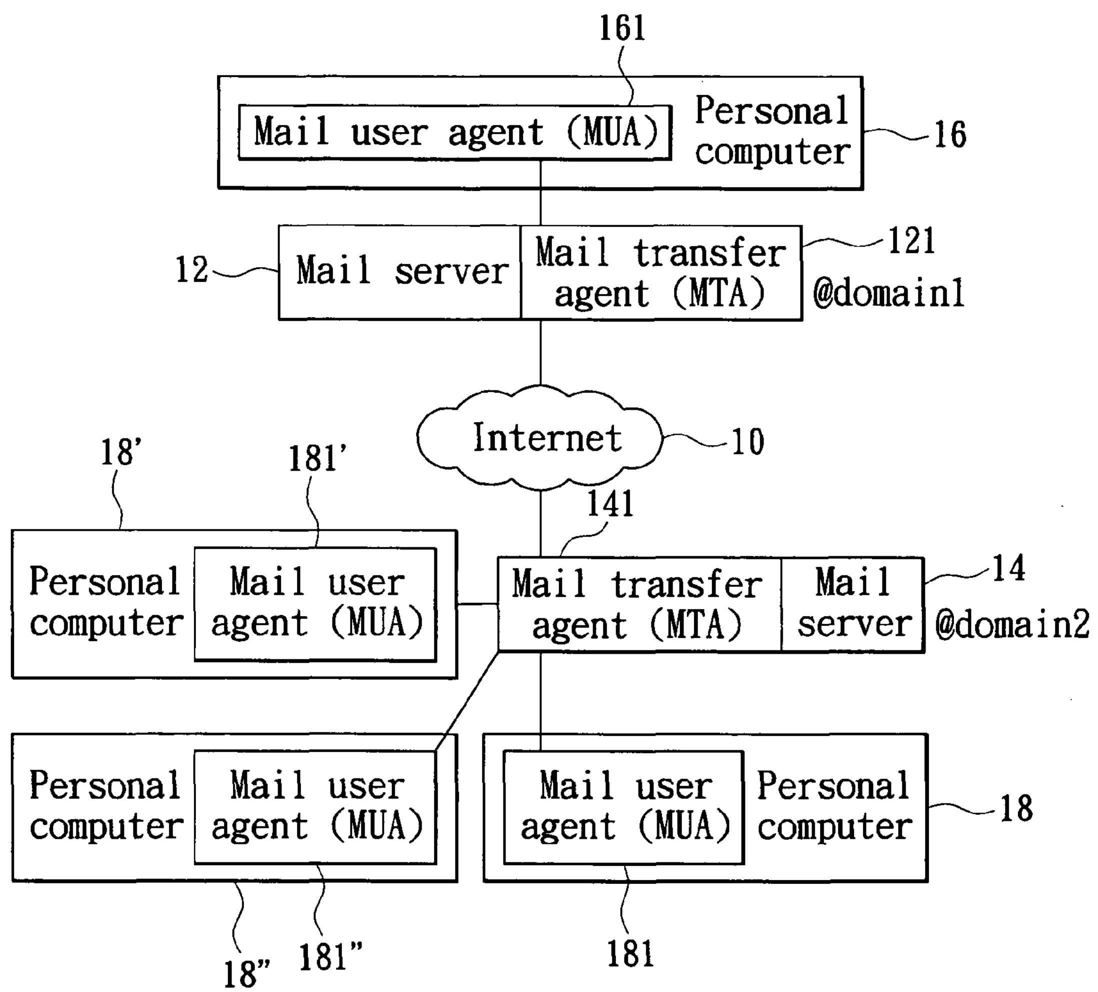
FIG. 1 shows the architecture of an e-mail system in accordance with the present invention.

In the network environment of the Internet or a local area network (LAN), a system including a plurality of mail servers is used for transmitting e-mails. Referring to FIG. 1 for the network architecture of an e-mail system, a first mail server 12 and a second mail server 14 are connected separately to the Internet 10, and each has a domain name, such as domain1 for the first mail server 12, wherein a mail transfer agent (MTA) 121 establishes the mail service of @domain1, and domain2 for the second mail server 14, wherein the mail transfer agent (MTA) 141 establishes the mail service of (domain2.

A plurality of computers used by users are connected directly or indirectly to the Internet 10, or directly connected to a personal computer 16 of the first mail server 12, and connected to personal computers 18, 18', 18" of the second mail server 14 as shown in FIG. 1, and each personal computer installs a mail user agent (MUA) such as Outlook, Mozilla Thunderbird and different mail sending and receiving software supporting different operating systems for receiving e-mails. In FIG. 1, users need to use a mail user agent (MUA) 161 installed in the personal computer 16 to transmit or receive e-mails, and a user at an opposite end can use a mail user agent (MUA) 181 installed in the personal computer 18, a mail user agent (MUA) 181' installed in the personal computer 18' or a mail user agent (MUA) 181" installed in the personal computer 18" to receive or transmit e-mails.

The message notice reply system in accordance with a preferred embodiment adopts e-mails for its process, but the procedures including the preparation, transmission and receipt and reply of messages are necessary to be transmitted via e-mail, since a specific proxy program can be used to achieve the specific communication protocol. Particularly, the reply software program for creating audio/video can maximize the utility of the functions of the message notice reply system. In addition to a general mail communication protocol, a peer-to-peer method can be used for the transmissions. The message agent of the mail user agent (MUA) introduces a message reply scheme, and the message notice in accordance with a preferred embodiment of the present invention can be a job delivered by a superior to a subordinate or among colleagues or friends.

Referring to FIG. 2A for a screen of a sender end of a message notice reply system in accordance with the present invention, the screen of a sender end of the message agent comprises two areas, respectively a sender's mail sending area 20 and a sender's mail receiving area 22, wherein the sender's mail sending area 20 includes a mail sending area field 201 and a message content list 203 comprised of information such as date/time, message recipient, subject, way to send, and time to reply. After a sender sends out a message, the sender can use the message agent to automatically set a default message subject, or manually create the message subject, and set the time to reply the message, wherein the time to reply is converted into a reply date after the time to reply is set to a few hours, a few days or a few weeks. The foregoing setup result and the date/time and sender of the transmitted message will be displayed automatically in the message agent field. Further, the above information can be sent by an audio/video, an audio/video handwriting document or a text mail, and the way to send is displayed in a creating method field 209 which includes a message produced by a scanned document or a retrieved screen, a message produced by an audio/video, a handwriting message, a pure text message, and a message produced by capturing a plurality of scans and a message produced by retrieving successive screens, and the aforementioned methods can be combined freely to produce a message, such as a mail produced by "scanned document or retrieved screen+audio/video+handwriting" or a mail simply produced by a "scanned document or a retrieved screen" or an "audio/video mail" produced by an audio/video preparing equipment" or a mail including "audio/video+handwriting mail" in its production or a "handwriting mail" carried out by a handwriting panel, or a mail combined with "handwriting+audio/video", such that the sender can produce different e-mails quickly by clicking a desired option, and needs to comply with each hardware equipment including an audio/video device, a handwriting panel and a scanner, etc.

More specifically, the mail is sent for the first time according to a method in the creating method field 209, and the record of sent message data is generated in the sender's mail sending area 20, but the mail is sent for the second time and thereafter by clicking any record of the message or any replied and received record of message in the sender's mail sending area 20 or the sender's mail receiving area 22, and then selecting a creating method in the creating method field 209 to complement the message for the second time, third time, fourth time to $n^{th}$ time. Thus, a sent reply time is not just for a one-to-one correspondence record only, but also for many sent or replied records. Further, the sender can select an option whether or not to complete the message (and the default setting is set to be not to complete), so that we can check the messages of all incomplete jobs.

Another area is provided for displaying the sender's mail receiving area 22, which comprises a mail receiving area field 205 and a message content list 207 including reply date/time, respondent, subject, and type of reply. After the message sender has transmitted a message, and set its time to reply (the time to reply or the person to reply may not set), a "wait to reply field" is added in the sender's mail receiving area 22 and displayed at a side of the corresponding transmitted message to record the reply message, in addition to the messages recorded in the aforementioned message content list 203 of the sender's mail sending area 20, similar to the aforementioned sender's mail receiving area 22 comprised of the mail receiving area fields 205 and the message content list 207. Further, a reply reminder is generated within a specific time according to the message of the wait to reply field.

In the embodiment as shown in the figure, the sender's mail sending area 20 records that a recipient B sent a message with a subject "Job" on January 3, and set the time to reply as January 10; and another person sent a message with a subject "Notice" to the recipient B on February 1 and set the time to reply as February 5, and sent a message with a subject "Announcement" to several recipients C, D, E, F. Further, the sender's mail receiving area 22 records that the recipient B sent a reply message with a subject "Re: Job" (which is automatically generated by adding the retrieved original subject of the received message behind the reply (Re:)) to the sender A (wherein it is not necessary to display the sender A on the screen) on January 8 to reply the message sent by the sender A, and the reply is made in the form of an audio/video message. In addition to the main reply method by using audio/video contents, another preferred embodiment can use a text message, and the sender's message can be transmitted simultaneously to a plurality of recipients. Now, the recipient field may show a plurality of recipients, and the corresponding fields will indicate a plurality of employee reply fields, so that each reply status can be traced easily. Each of the field contents can be opened by clicking with a mouse or any other pointing device, and the screen display facilitate users to trace each reply message. In another preferred embodiment, if the time to reply of the sender end is up, but no mail is replied yet, then the program will automatically generate a number of times of the reply reminders, and such reply reminders will be shown automatically on a computer screen or dialed automatically to a preset telephone or mobile phone through the function of a VoIP to provide an effective reminder automatically.

In this preferred embodiment, the sender can click the message in the sender's mail sending area 20 again to resend the already transmitted message to other persons and set the time to reply. Now, the message content list 203 in the sender's mail sending area 20 produces a record of the sent message, and displays each sent message according to the sending order. Similarly, if the recipient end repeatedly makes a reply, the sender's mail receiving area 22 of this embodiment will produce a record of the reply message in the message content list 207 again, and display each reply message according to the reply order.

Referring to FIG. 2B for a screen of a recipient end of a message notice reply system in accordance with the present invention, the message agent comprises two areas, respectively a recipient's mail receiving area 24 and a recipient's reply area 26, wherein the recipient's mail receiving area 24 comprises a mail receiving area field 211 consisting date/time, message sender, subject, way to receive, and time to reply, and the information of the received message is displayed at the message content list 213. After the message is received, the message agent will analyze the message content to display the information of the message such as the field contents of date/time, message sender, subject, way to receive, and time to reply, etc. If the message is a message with an attached message reply control entry, then the recipient's reply area 26 will add the a reply area field 215 (comprising the fields of reply date/time, respondent, subject and reply method) corresponding to the message, and produce a corresponding message in the message content list 217 after the reply is made.

In this preferred embodiment, the sender also can click a message in the recipient's mail receiving area 24 to send the already replied message to the original sender. Now, the message content list 217 in the recipient's reply area 26 will produce another record of reply message, indicating that the reply has been made for several times, and each message is displayed according to the reply order. In the same time, if the recipient end receives such reply message repeatedly, the mail receiving area also displays another record of reply message. In the embodiment as shown in the figure, the recipient receives the "Job" message sent by the sender A on January 3 and learns from the message content that the time to reply is January 10, since this message has set the time to reply, and thus a "reply reminder field" is added and displayed at a side of the corresponding received message, for recording a required reply message, similar to the aforementioned recipient's reply area 26 comprised of the reply area field 215 and the message content list 217. Further, a reply reminder (displayed on the screen, or dialed to a telephone or mobile phone through a network by an integrated VoIP technology) is produced (repeatedly) in a specific time according to the message of the reply reminder field, and the way to receive including an audio/video, an audio/video handwriting document, and a text mail is recorded.

In the embodiment as shown in the figure, the sender A sent a message with a subject "Notice" on February 1 and set the time to reply as February 5, and received a "Notice" message sent by a sender C on February 3 and a set time to reply on February 7.

However, after the recipient has received a reply message of the sender, the recipient's reply area 26 has recorded the reply message. In the embodiment as shown in the figure, the message content list 217 records that the recipient B replied a reply "Re: Job" message on January 8, and the way of replying the message is by an audio/video document, or by a text reply in accordance with another preferred embodiment. Further, it is recorded that the reply message "Re: Notice" is sent by the recipient B on February 3, the way of replying the message is by a scanned document.

When the reply is made, it is necessary to click any one of the records in the message recipient's mail receiving area 24 first, and use the creating method field 219 to select a way of producing the reply message, which includes a message produced by a scanned document or a retrieved screen, an audio/video message, a handwriting message, a pure text message, a message produced by capturing a plurality of scans, a message produced by retrieving successive screens, and a message produced by any combination of the above such as a mail produced by the "scanned document or retrieved screen+audio/video+handwriting' or a mail simply produced by a "scanned document or a retrieved screen" or an audio/video mail prepared by an audio/video apparatus or an "audio/video+handwriting mail" produced by a handwriting panel, or an integrated "handwriting+audio/video" mail, so that the sender can produce different e-mails quickly by clicking a desired option, and the sender has to comply with each hardware equipment including an audio/video device, a handwriting panel and a scanner, etc. More specifically, when the reply is made, several copies of the replies can be duplicated to any record of the received message item in the same recipient's mail receiving area 24, so that users can complement any missing description of the reply anytime.

In the reply mechanism in accordance with the foregoing preferred embodiment, a message reply control entry is introduced to the transmitted message, and the information comprises control entries such as time to reply, reply address and wait/reply reminder field. If the message is transmitted from the sender, the message agent at the message sender end will add one or more wait-to-reply fields, wherein the date/time, or reply person is not restricted, and the message reply control entry is attached to the message, and the wait to reply field is recorded, and the recipient's reply message is displayed as shown in FIG. 2A.

After the recipient end receives and opens the message, the message agent at the recipient end adds a reply reminder field according to the attached control entry information, wherein the recorded contents are listed in a screen of the recipient end as shown in FIG. 2B, and a reminder is issued to the recipient within the recorded deadline (which is a default setting or a period such as three hours or a day set by users). After the recipient end has replied the message, the reply is recorded in the reply reminder field, which will be converted into a reply date automatically, and at least record the reply date/time. After the sender end has received the reply message, the attached message (such as the message reply control entry) is recorded into the wait-to-reply field according to the message attached to the reply message, and at least the reply date/time is recorded, so as to achieve the purpose of replying to a message after a job is delivered.

The aforementioned message notice reply system can further transmit an audio/video document produced by the audio/video retrieving apparatus, and the handwriting system. After the recipient end has received the audio/video document, the aforementioned message reply mechanism is provided for replying an audio/video message. In addition, the message agents of the sender and the recipient in accordance with this preferred embodiment are mail user agents (MUA), and the transmitted and received messages are in the form of e-mails, and the devices used by both of them are desktop computers or notebook computers or other portable communication devices including personal digital assistants (PDA) and mobile phones, etc. Further, the sender end can transmit the foregoing message to the recipient end at the same time, and the recipient end can have a plurality of recipients.

Figure 2C:
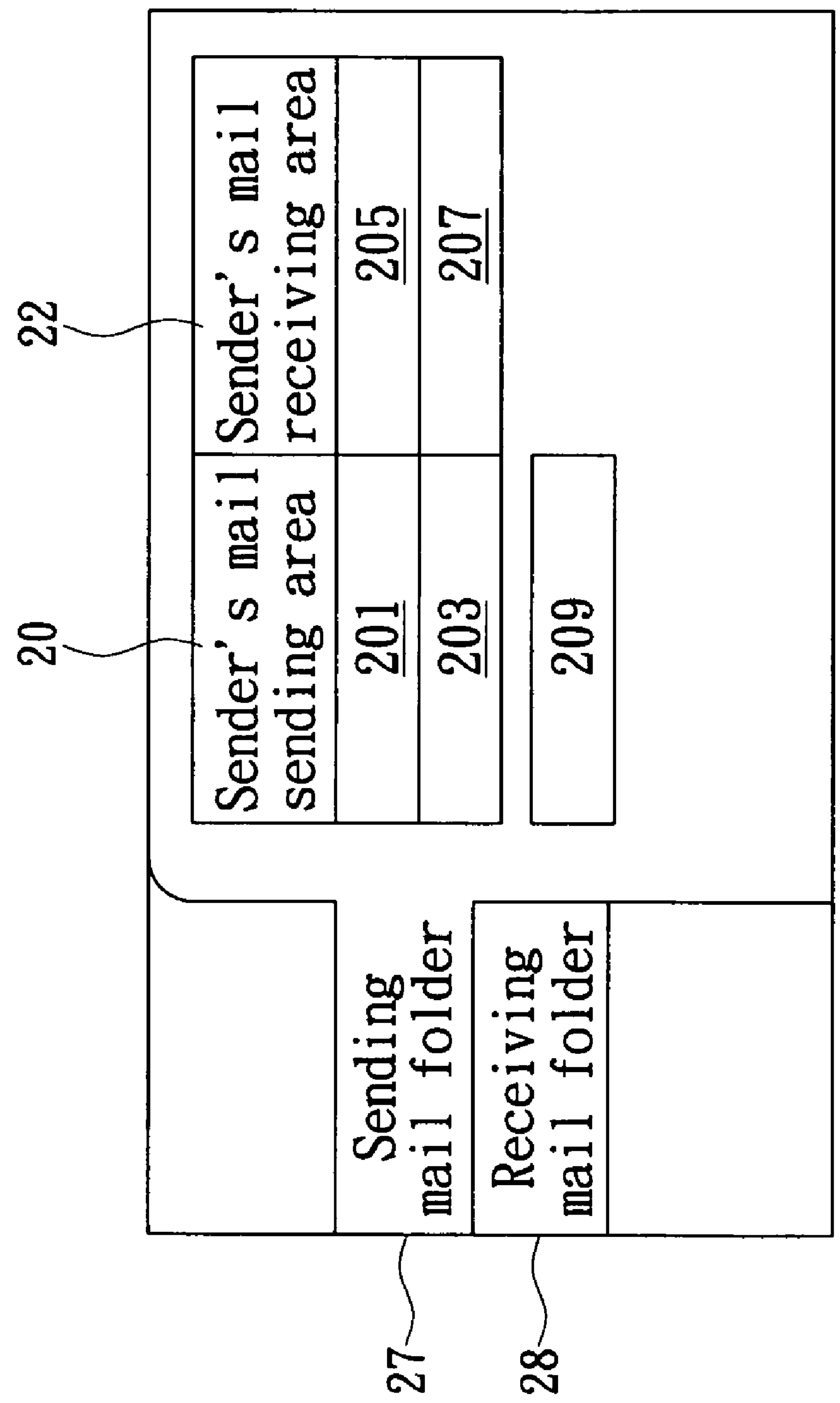
FIG. 2C shows a screen of a message agent in accordance with the present invention.

The message notice reply system in accordance with the present invention comprises the aforementioned mail sending and receiving functions integrated in the message agent as shown in FIG. 2C, and the program comprises a sending mail folder 27 and a receiving mail folder 28, wherein the functions include using a message agent to achieve mail sending means and mail receiving means, such that the sending mail folder 27 or the receiving mail folder 28 can be browsed by switching a computer cursor (or a mouse cursor or a keyboard control), and the display method is not limited those illustrated in the figure, but also includes other required mail sending and receiving functions of an e-mail system.

In a preferred embodiment as shown in FIG. 2C, a sending mail folder 27 displayed on the screen of the send end as shown in FIG. 2A comprises two areas, respectively a sender's mail sending area 20 and a sender's mail receiving area 22, and the sender's mail sending area 20 includes a mail sending area field 201 and a message content list 203, and the sender's mail receiving area 22 has a mail receiving area field 205 and a message content list 207, and several creating methods 209 displayed in accordance with a preferred embodiment include the foregoing "scanned document or retrieved screen+audio/video+handwriting", "scanned document or retrieved screen", "text mail", "audio/video mail", "audio/video+handwriting mail", "handwriting mail", "captured scanned documents+audio/video+handwriting", "successive retrieved screens+audio/video+handwriting" and "handwriting+audio/video mail', etc.

FIG. 2D shows a directory used by a message agent in accordance with a preferred embodiment of the present invention, and if it is necessary to produce a message, the name list of recipients in the directory 29 can be used for the selection, and the recipients can be divided into groups 291 to facilitate their search and display, and each group 291 displays its respective fields such as name 293 and e-mail 295, etc. The select field 297 is provided for selecting one or more recipients, and after the selection is completed, a reply deadline can be set in the deadline setup field 298, such as a few hours, a few days or a few weeks, and the program will automatically convert the reply deadline into date and time for the display.

Figure 3:
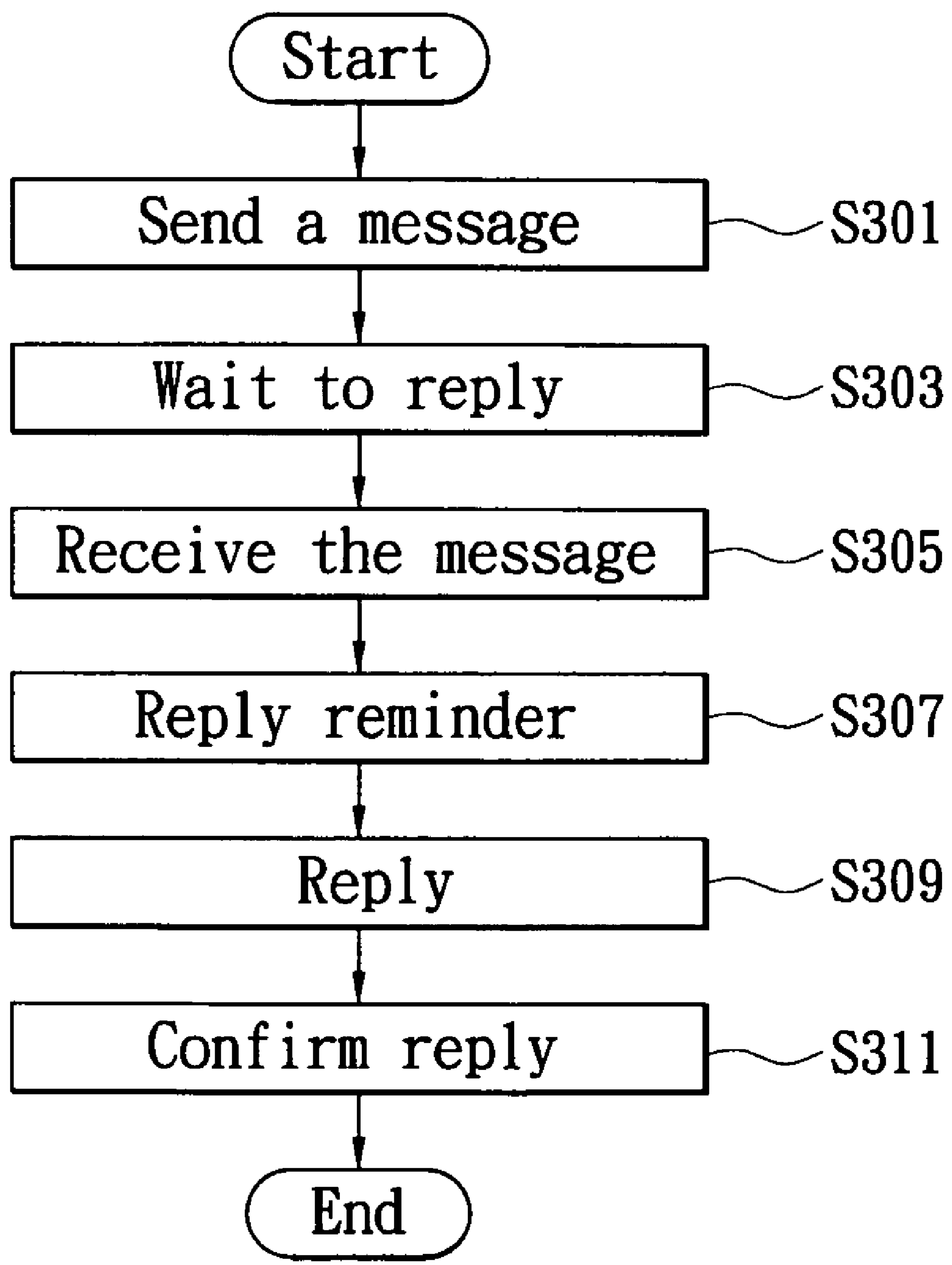
FIG. 3 shows a flow chart of a message notice reply system and its method in accordance with the present invention.

FIG. 3 shows a flow chart of a message notice reply system and its method in accordance with the present invention, the message notice reply system of the invention introduces the foregoing message agent to the message reply mechanism, and includes a plurality of functional means as described below:

1. (Step S301) When the message sending means uses a message agent to send a message, a message reply control entry is attached to the message, and if the message is in the form of an e-mail, then a mail user agent (MUA) connects to an outgoing mail server. After the sender is verified (and the verification is not a must), the e-mail is sent to a receiving end, and the message can be a text, a scanned document or a file including an audio/video document produced by an audio/video retrieving apparatus and attached to the message and a dynamic description produced by a handwriting system and recorded.
2. (Step S303) Before the waiting-to-reply means sends out the message, a time to reply the message is set. After the message is set, one or more wait-to-reply fields are added to the message agent, and the wait to reply fields are displayed on a side corresponding to the message.
3. (Step S305) The recipient receives the message by the message agent. If the message is in the form of an e-mail, then a mail user agent (MUA) connects to an incoming mail server, and receives the e-mail after the recipient is verified.
4. (Step S307) The reply reminding means records the message into the message agent after the message agent analyzes the received message content, and then a reply reminder field is added to remind the recipient to reply within a specific deadline (and the reminding method includes using the VoIP technology for the reminder), and the reply reminder field is displayed at a side corresponding to the message.
5. (Step S309) When the recipient completes the job delivered by the sender or other required replies, the recipient selects a desired reply message first, and sends a reply message by the message agent, wherein the message reply control entry is attached, and the reply reminder field is recorded to indicate the completion of a reply, and the reply message can be a text, a scanned document or a file, including an audio/video document produced by an audio/video retrieving apparatus and attached to the reply message, or a handwriting dynamic description of the reply message produced by the handwriting system;

6. (Step S311) Confirm that the replying mean records the information of a message reply control entry after the sender has received the recipient's reply message and analyzes the information recorded in the message, and then wait-to-reply field is added to the message agent before being recorded.

The above procedure can be repeated. In other words, if a message is replied, a message reply control entry can be attached to the reply message, or a reply deadline is set after the original sender has received the reply message, so that the message notice reply method can be used repeatedly to achieve the purpose of replying and completing the delivered job.

Figure 4A:
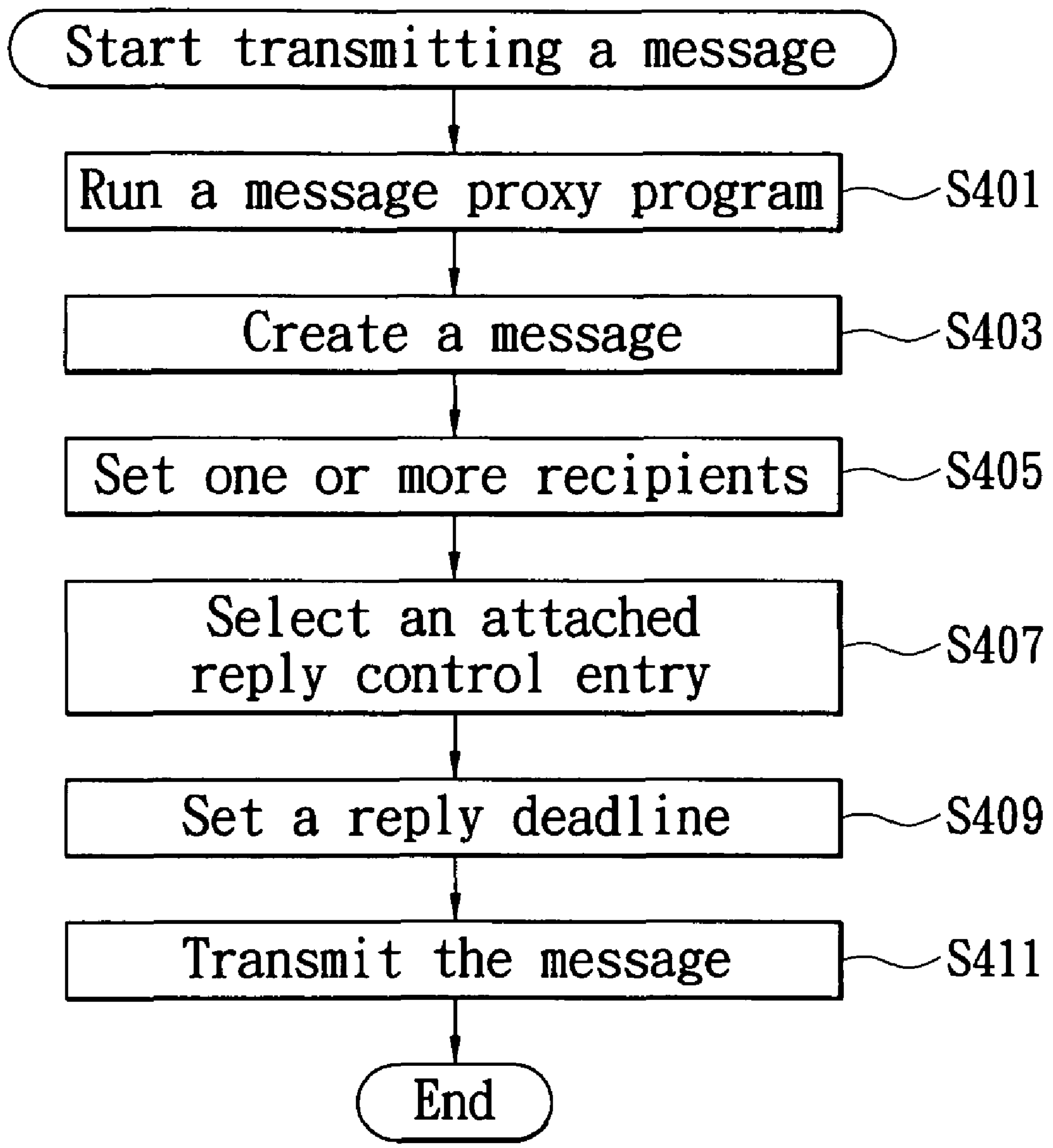
FIG. 4A shows a flow chart of transmitting a message by a message notice reply system in accordance with the present invention.

The message notice reply system of the invention is illustrated in details by the following embodiments, such as the message transmitting procedure as shown in FIG. 4A.

The invention uses a message agent such as a mail user agent (MUA) in a computer system for transmitting a message. In the beginning, a sender turns on a message agent (Step S401), and uses an editing program to create a message, and inputs the required notice items. (Step S403), and sets one or more recipients (Step S405), and selects a message reply control entry to be attached. In this step, the sender can either select or not to select a recipient reply message. If the sender decides not to select the recipient reply message, then the default setting of not to reply can be adopted (If it is necessary to set a reply message in Step S407, the sender has to set the time to reply, and the time to reply can be inputted manually or a predetermined time in a menu can be selected (Step S409), and then transmitted. If the mail user agent (MUA) is used for transmitting the message, then it is necessary to transmit the message to the recipient through an outgoing mail server (such as a MTP server) (Step S411).

Figure 4B:
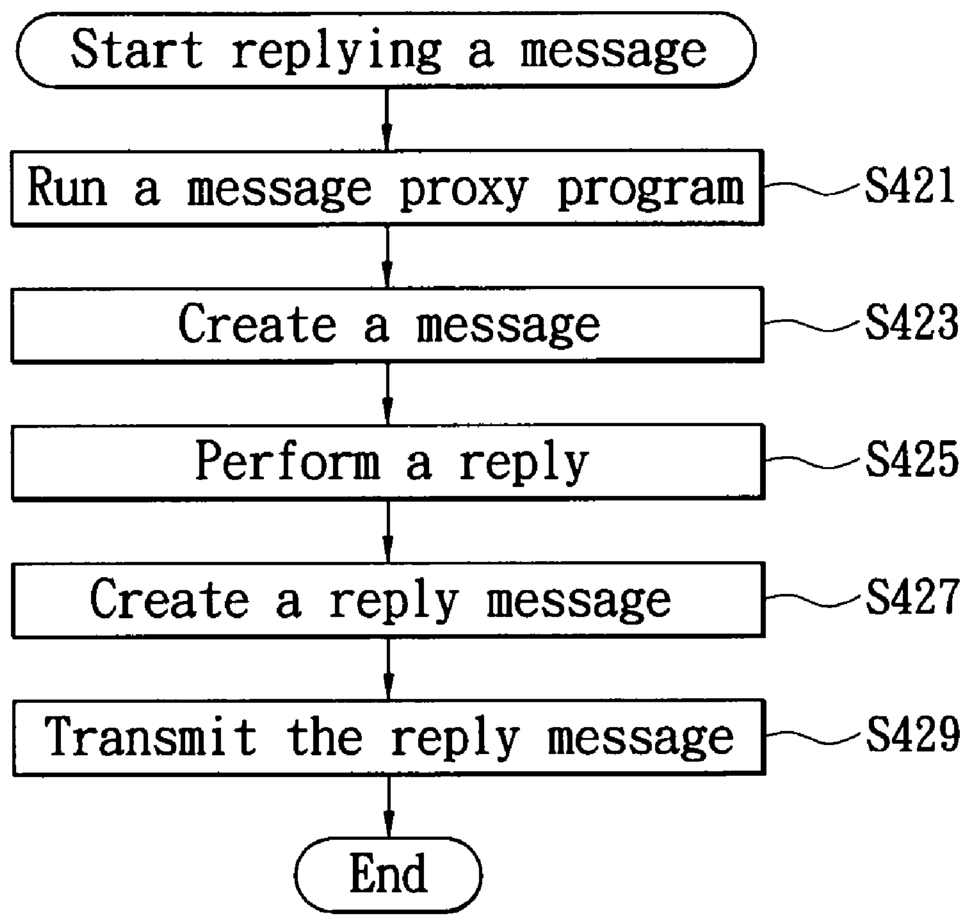
FIG. 4B shows a flow chart of replying a message by a message notice reply system in accordance with the present invention.

FIG. 4B shows a flow chart of replying a message by a message notice reply system in accordance with the present invention. After the procedure of the flow chart is operated for receiving a message from the sender, the message agent such as a mail user agent (MUA) in a computer system is used for replying the message. At the beginning, the recipient turns on the message agent (Step S421), and then selects a desired reply message (Step S423) and sends the reply, wherein the related message reply control entry is still attached to the message (Step S425), or after the reply is completed, a reply message is created first (Step S427) and then transmitted (Step S429).

Figure 5A:
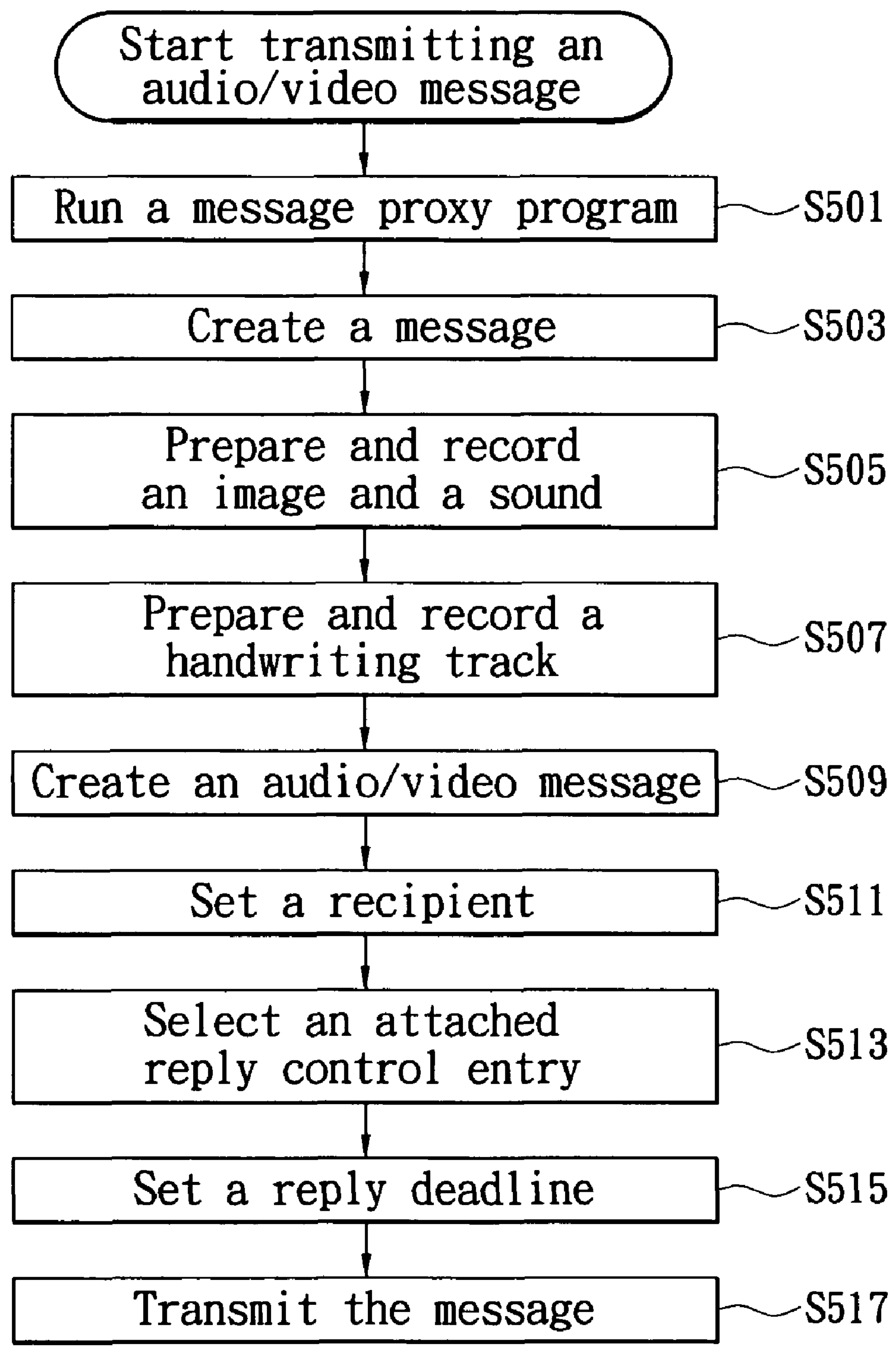
FIG. 5A shows a flow chart of transmitting an audio/video message by a message notice reply system in accordance with the present invention.

The aforementioned mail sending and replying processes use the message agent for transmitting the message. When it is necessary to create a desired sending message, the invention further uses an image capturing device, a sound capturing device, a document scanner, or a handwriting device to create the desired sending message as illustrated by in the flow chart of sending an audio/video message by a message notice reply system of the invention as shown in FIG. 5A.

The invention transmits a message by the message agent such as a mail user agent (MUA) used by a computer system in accordance with a preferred embodiment of the invention. At the beginning, the sender turns on the message agent (Step S501), and creates a message (Step S503) such as a message containing images and sound produced by an image capturing device and a sound capturing device including a camcorder in addition to a general document (Step S505), and a handwriting description of a handwriting track can be added to a general document or a scanned document (Step S507), and the foregoing images, sound, documents and handwriting description are integrated to produce an audio/video message (Step S509), and the audio/video message in this preferred embodiment is created by the audio/video document method disclosed by R.O.C. Pat. Application No. 93130138 entitled "Network audio/video document facsimile device and synchronous classified filing method" and filed by the inventor of the present invention on Oct. 5, 2004.

Then, a recipient is set (Step S511), and a message reply control entry is selected to be attached. In this step, the sender can select whether or not to have a recipient reply message (Step S513). If a reply message is required, then the time to reply is set, and the time to reply can be inputted manually or by selecting a preset time on a menu (Step S515), and then transmitted (Step S517).

Figure 5B:
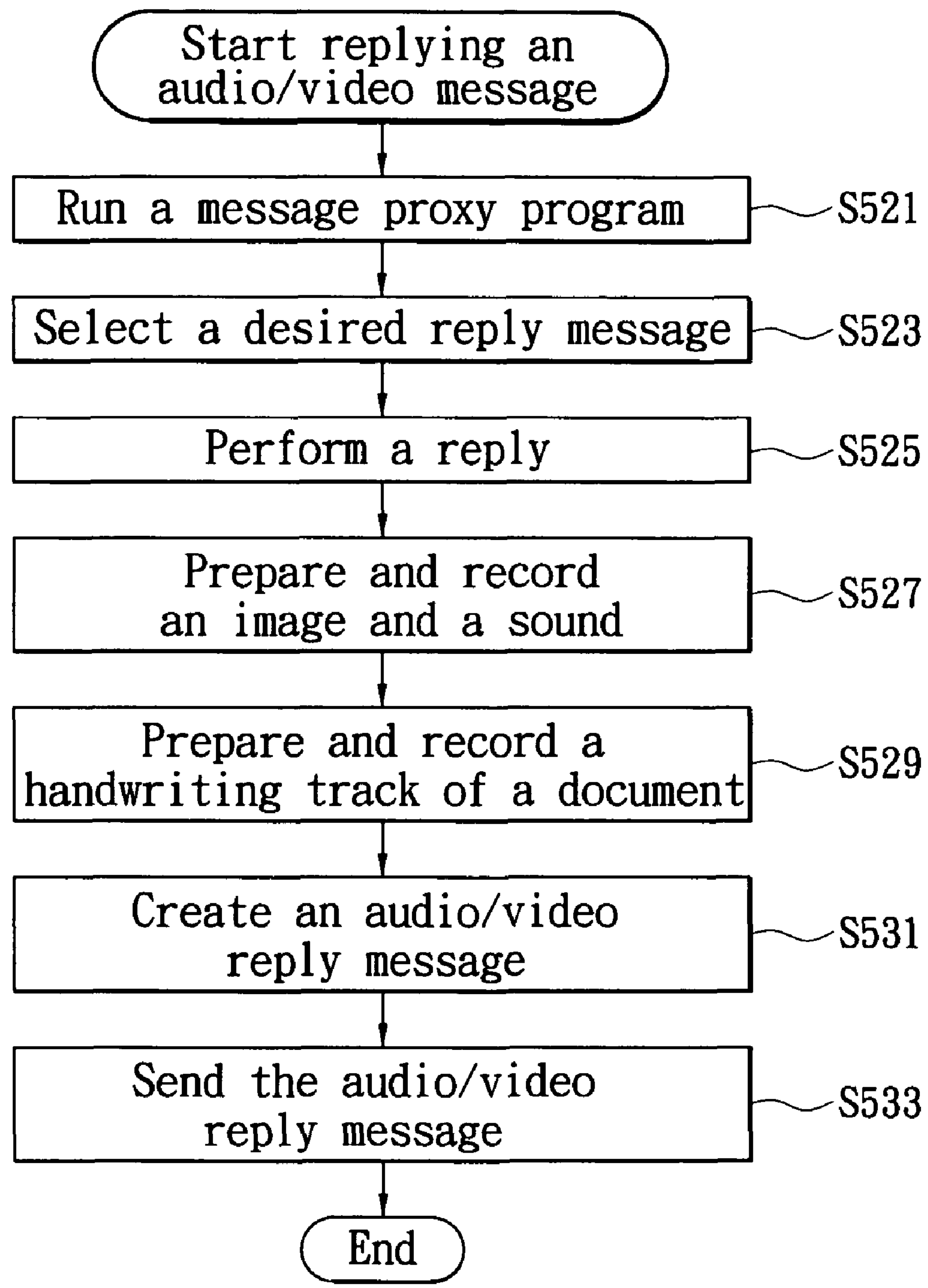
FIG. 5B shows a flow chart of replying an audio/video message by a message notice reply system in accordance with the present invention.

FIG. 5B shows a flow chart of replying an audio/video message by a message notice reply system in accordance with the present invention, the invention not only allows the sender to send an audio/video document, but also allows the recipient to reply by an audio/video document. At the beginning, the recipient turns on a message agent (Step S521), and selects a desired reply message from a message list, (Step S523), and makes a reply by executing a reply function in the message agent (Step S525), and then prepare an image and sound by an image capturing device and a sound capturing device in addition to a general document (Step S527), and records a handwriting track on the general document or scanned document (Step S529), and the foregoing images, sounds, documents and handwriting contents are integrated to produce an audio/video reply message (Step S531). Similarly, and the audio/video message in this preferred embodiment is created by the audio/video document method disclosed by R.O.C. Pat. Application No. 93130138 entitled "Network audio/video document facsimile device and synchronous classified filing method" and filed by the inventor of the present invention on Oct. 5, 2004. After the audio/video reply message is created, the message agent automatically attaches the message reply control entry, and the message agent is used for transmitting the audio/video message (Step S533).

Figure 6:
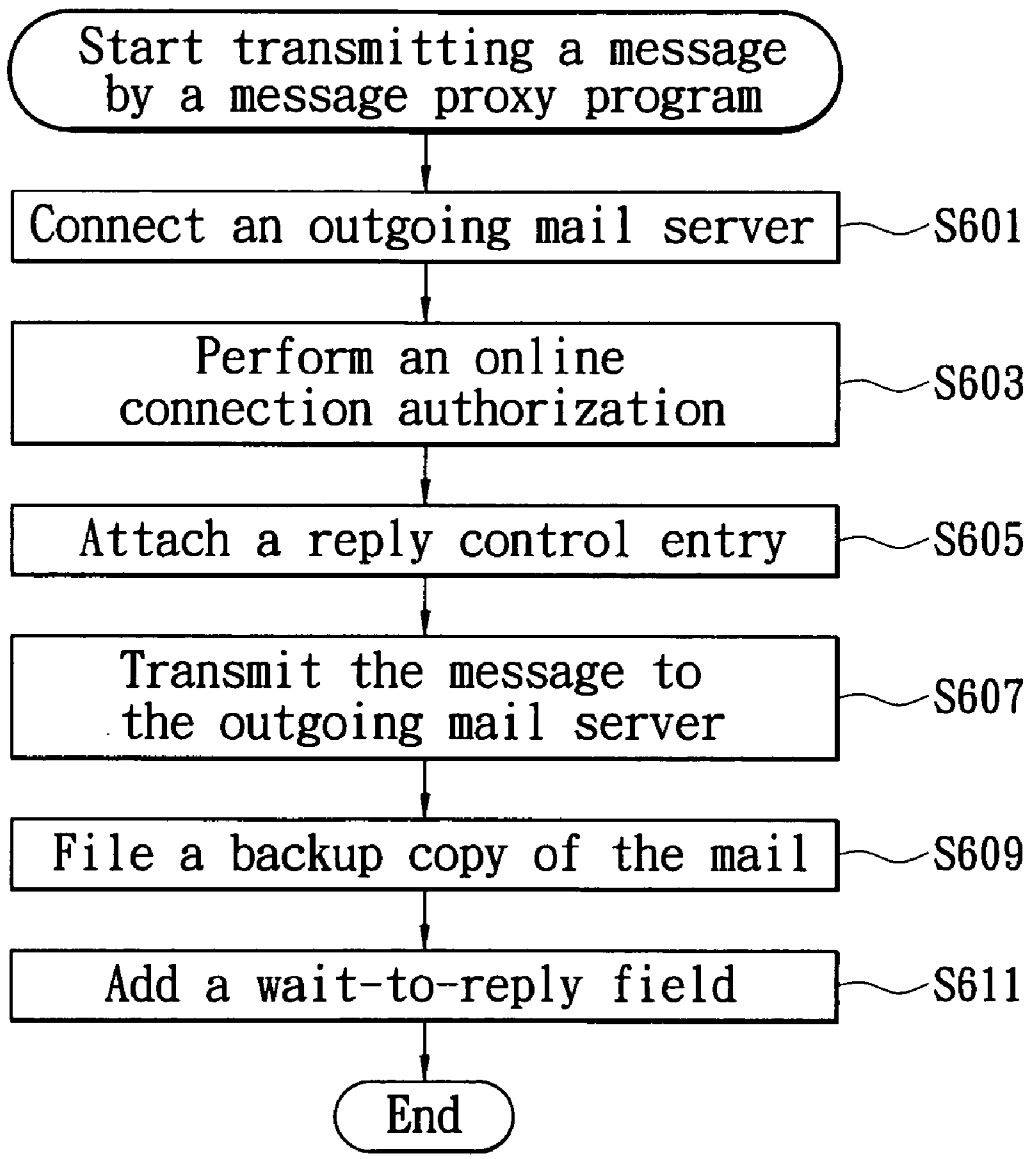
FIG. 6 shows a flow chart of transmitting a message by a message agent of a message notice reply system in accordance with the present invention.

FIGS. 4A and 5B show the flow charts of a message notice reply system of the invention from the view point of the users, but the message agent itself actually transmits a message as shown in FIG. 6. At the beginning, the message agent connects to an outgoing mail server (first). If the message is transmitted by an e-mail, then it is necessary to connect to an outgoing mail server in compliance with the simple mail transfer protocol (SMTP) (Step S601), and may need to execute an online connection authorization to make sure that the sender has gone through the server authorization (Step S603), and then the message agent attaches a reply control entry to the message, and produces the record of a time to reply set by the sender, such that after the recipient's message is analyzed by the message agent, a reply reminder field is added to the message agent (Step S605). Then, the completed message is transmitted to the aforementioned outgoing mail server (first), and then transmitted to the recipient end through the server (Step S607). Now, the message agent at the sender end will file a backup copy of the transmitted message, such as a backup copy recorded in the sender's mail sending area as shown in FIG. 2A (Step S609), and then one or more wait-to-reply fields such as those recorded in the sender's mail receiving area as shown in FIG. 2A are added for waiting for a reply from the recipient within a deadline (Step S611).

Figure 7:
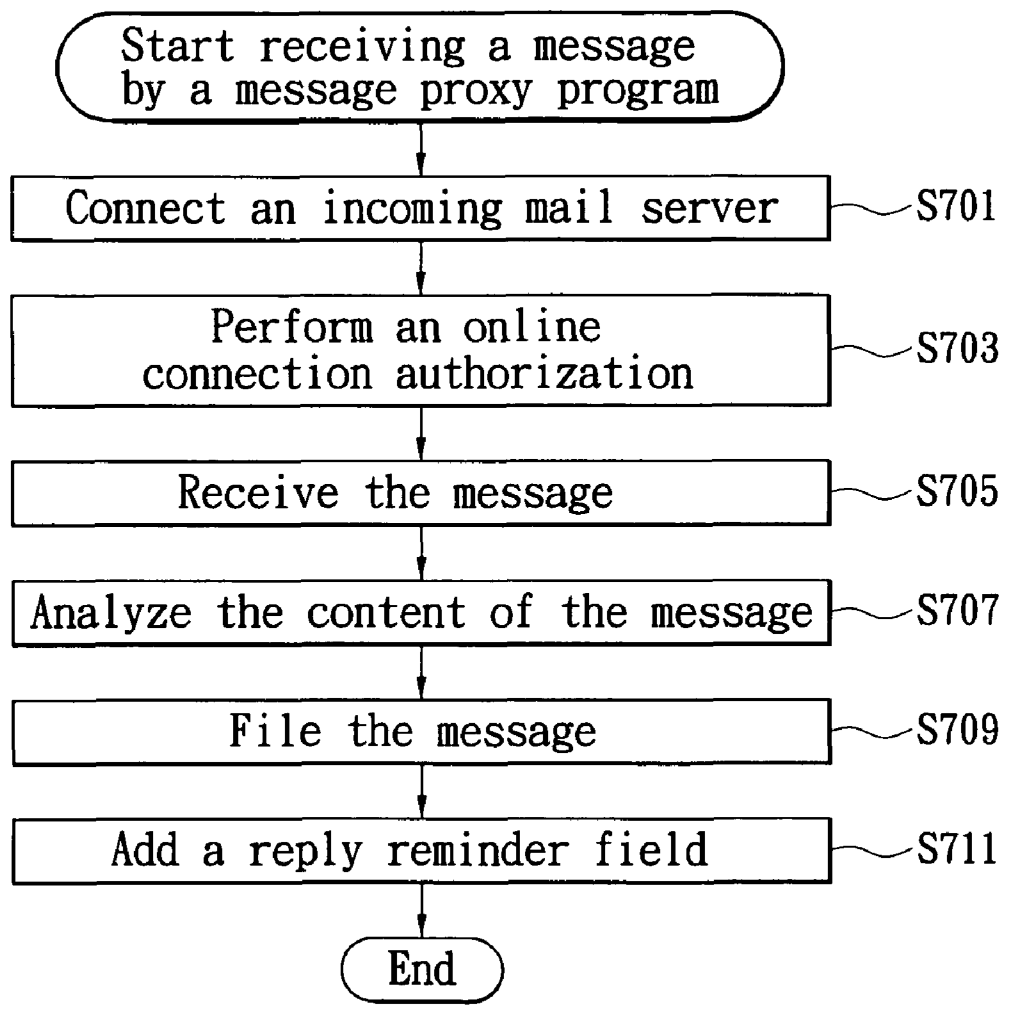
FIG. 7 shows a flow chart of receiving a message by a message agent of a message notice reply system in accordance with the present invention.

In the procedure at the receiving end as shown in FIG. 7, a message agent is used for receiving a message, and the message agent connects to an incoming server (second). If the message is transmitted by an e-mail, then the incoming mail server uses a general POP3 or an Internet Message Access Protocol (IMAP) incoming mail server (Step S701) to execute an online connection authorization for performing a user verification (Step S703), and the message is received after the verification (Step S705), and after the message is received to the message agent, the message content is analyzed, and related information including the source and content of the message and whether or not the message reply mechanism such as the time to reply can be learned from the message (Step S707), and then the information in each field of the recipient's mail receiving area as shown in FIG. 2B is filed according to the analyzed message, such that the message is recorded in the message agent (Step S709). Since the required deadline of the reply can be found from the analyzed message, therefore a reply reminder field is added into the recipient's reply area as shown in FIG. 2B (Step S711) for performing a reply reminder at a specific time.

Figure 8:
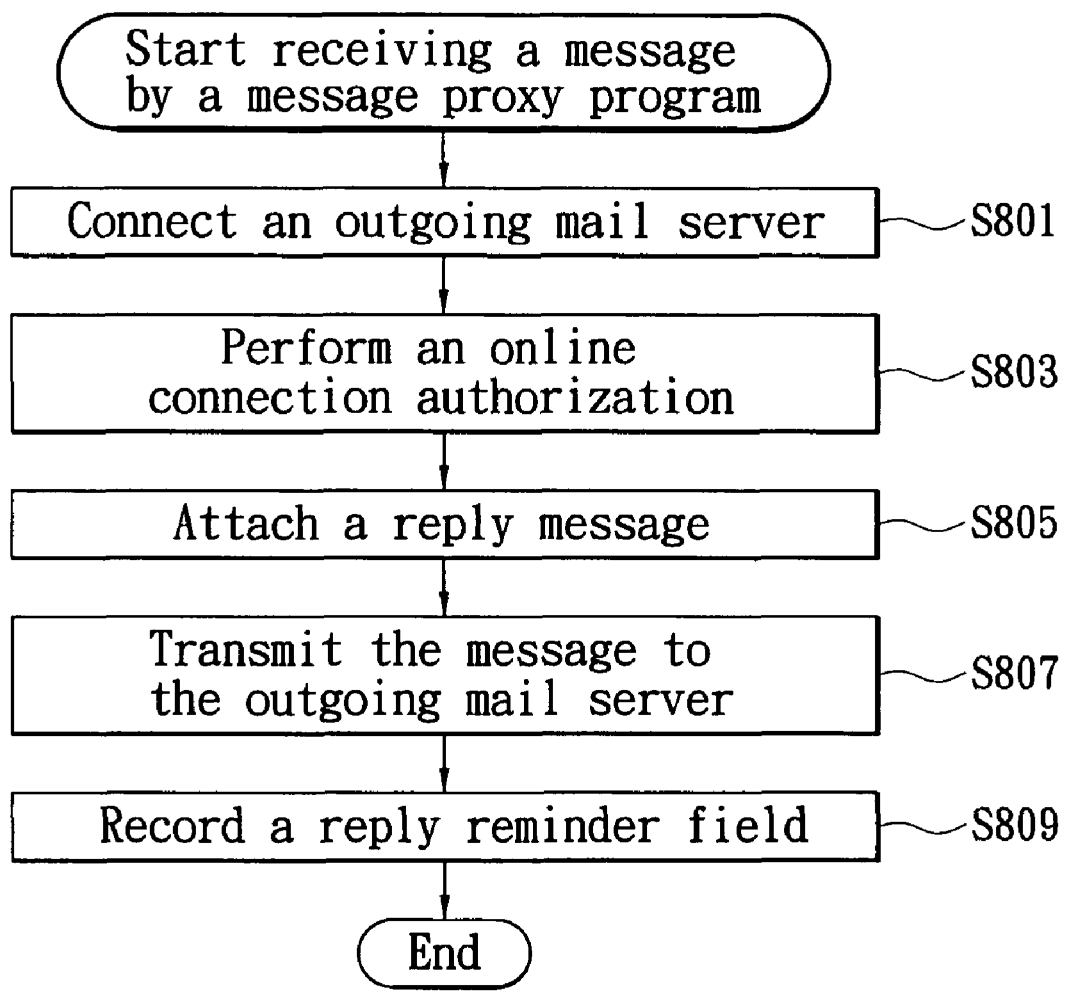
FIG. 8 shows a flow chart of replying a message by a message agent of a message notice reply system in accordance with the present invention.

In the description above, the recipient records the received message in the message agent, and adds the reply reminder field at the same time for executing a reply message procedure to the message agent at the recipient end within a deadline (or after the expiration) as shown in FIG. 8.

The message agent connects to an outgoing mail server (second), wherein the outgoing mail server at the sender end is not necessary to be the same) (Step S801), and executes an online connection authorization. After the recipient end goes through the authorization, the message is transmitted (Step S803), but this step is not a must, and the outgoing mail server can verify the user by other methods or is opened directly to the connected users for transmitting messages. After the online connection authorization is completed, a reply message such as a message reply control entry is attached to notice the original sender that the message is the previous wait-to-reply message (Step S805), and then the reply message is transmitted to the outgoing mail server (Step S807), and the message agent records the reply reminder field automatically (Step S809).

Figure 9:
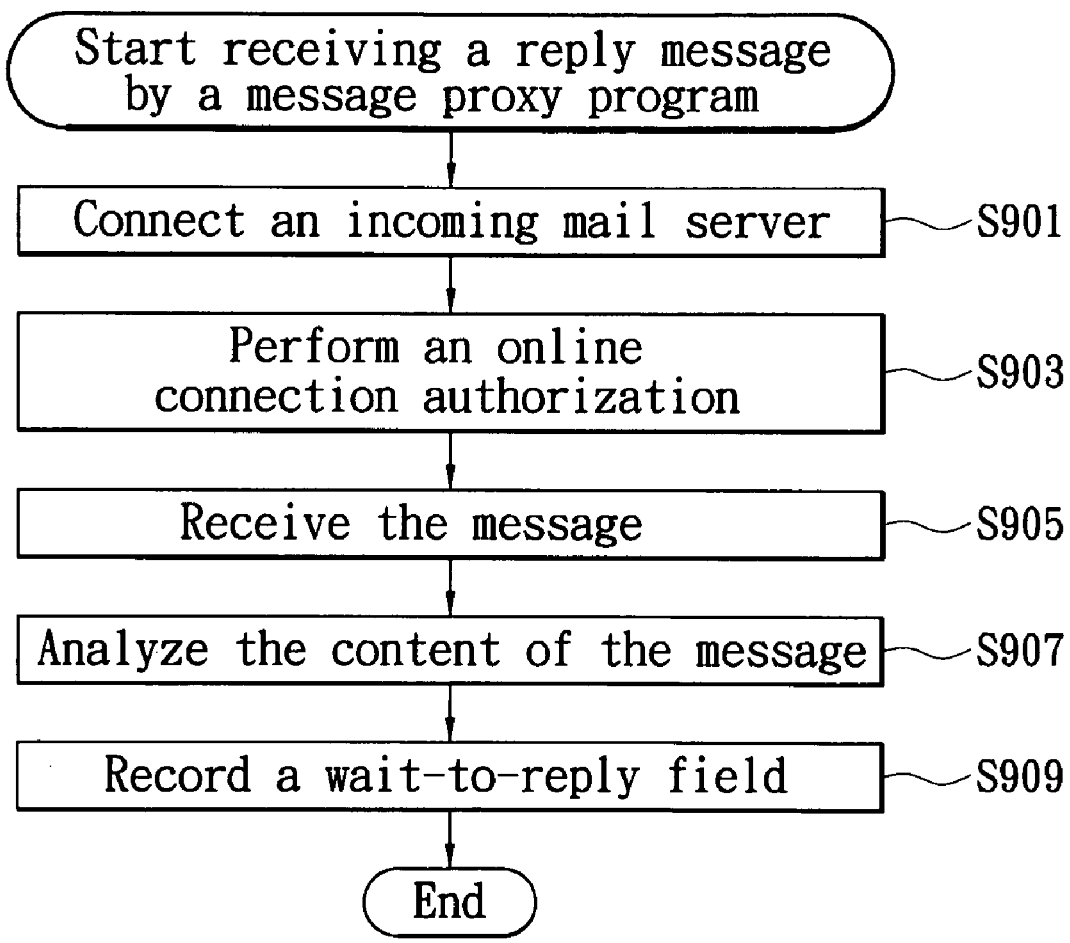
FIG. 9 shows a flow chart of replying a message by a message agent of a message notice reply system in accordance with the present invention.

After the recipient has replied the message, the message agent of the message notice reply system of the invention receives the reply message according to the procedure as shown in FIG. 9. The original sender uses the message agent to connect to an incoming mail server (first) wherein the incoming mail server at the recipient end is not necessary the same one such as a POP3 server or an IMAP server (Step S901), and then an online connection authorization is executed (Step S903), and the message is received after going through the verification (Step S905), and the content of the received message is analyzed (Step S907), and the information of the received message (such as the message reply control entry attached to the message) can be known from the message which is a message with a previously set time to reply, and recorded in the corresponding wait to reply field (Step S909).

Figure 10:
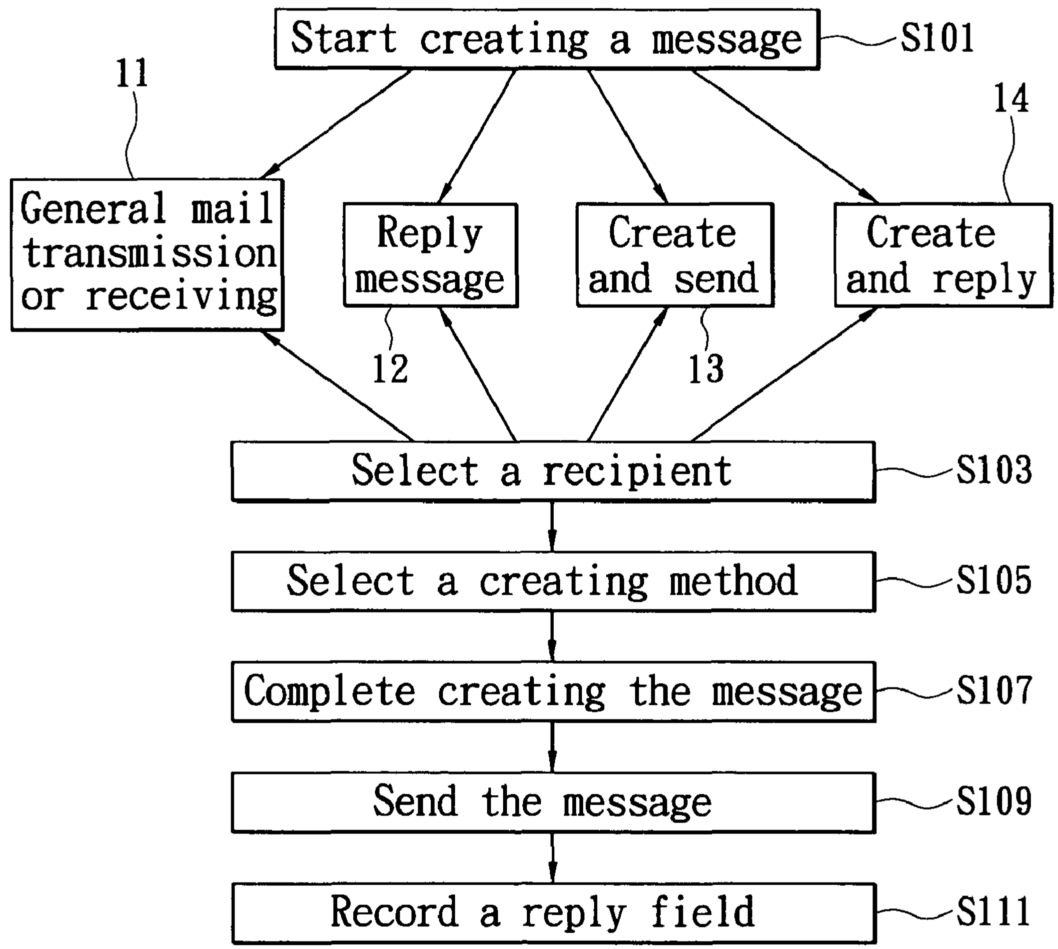
FIG. 10 shows a flow chart of a message notice reply system selecting a message creating method in accordance with the present invention.

FIG. 10 shows a flow chart of a message notice reply system selecting a message creating method in accordance with the present invention. At the beginning, software and hardware for the message notice reply system of the invention are prepared (Step S101), wherein the software includes a message agent, and the hardware includes an audio/video preparing apparatus, a scanner, and a handwriting panel, etc, and the conditions for producing the message include a general transmission (11), which is a new message. There is a message reply (12), which is a message replied after the mail is received. There is another way of preparing and sending the message (13), wherein the already sent message can be sent once again such as forwarding to other recipients, or sending a complement to the recipient. There is another way of preparing a reply again (14), wherein the already replied message is prepared and replied to the original sender once again.

The recipient of the message is specified by selecting a recipient from a director as shown in FIG. 2D (Step S103), and then a creating method is selected (Step S105), wherein the preferred embodiments include the methods such as "scanned document or retrieved screen+audio/video+handwriting", "scanned document or retrieved screen", "text mail", "audio/video mail", "audio/video+handwriting mail", "handwriting mail", "captured scanned documents+audio/video+handwriting", "successive retrieved screens+audio/video+handwriting" and "handwriting+audio/video mail", etc.

After the creating method is selected, the message is produced step by step (Step S107), and each way of executing the corresponding application program such as an audio/video preparing program, a handwriting interface, a scanned document or retrieved screen program, and integrating the software and hardware to produce an audio/video multimedia or traditional text or a graphic message, and then such message is sent out (Step S109). In the meantime, the message is recorded in the reply field of the sender end or recipient end (Step S111), and the time to reply can be set if required.

In summation of the description above, the present invention is unlike the general software for transmitting messages. With the aforementioned technical contents, the software can actively divide the processed, non-processed, replied, non-replied messages, so as to achieve the purpose of tracing the progress or schedule of each delivered job. With the procedure of transmitting a message as shown in FIG. 6, the procedure of receiving the message as shown in FIG. 7, the procedure of replying the message as shown in FIG. 8, and the procedure of receiving a replied message as shown in FIG. 9, the message notice reply system and its method of the invention can be achieved, wherein the transmitted message includes a text, an audio/video message, a handwriting dynamic description, a graphic file or a scanned document or a retrieved screen, plus audio/video, handwriting, or captured scanned document, audio/video, handwriting, or successive retrieved screens, and audio/video, handwriting, etc.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A message notice reply system, with a message reply mechanism incorporated into a sender end and a recipient end for adding a message reply control entry to transmit a message between the sender end and the recipient end, comprising:

a mail server providing a mail transfer agent for establishing a mail service over a network;

a sender's personal computer at the sender end having a first mail user agent defining a sender's mail sending area and a sender's mail receiving area when interfacing with human operators at the sender end, wherein when the message is sent via the mail transfer agent, the first mail user agent adds one or more wait-to-reply fields that are displayed at first predetermined positions of an interface of the first mail user agent, and the wait-to-reply fields include a reply time, a respondent, a subject, and a reply manner; and a recipient's personal computer at the recipient end having a second mail user agent defining a recipient's mail receiving area and a recipient's reply area when interfacing with the human operators at the recipient end, wherein when the message is received via the mail transfer user agent, the recipient's reply area adds a reply reminder field that is displayed at a second predetermined position of an interface of the second mail user agent, wherein the reply reminder fields include a reply time, a respondent, a subject and a reply manner;

thereby, after the recipient end replies with a reply message via the second mail user agent, information associated with the reply message is recorded in the corresponding reply reminder fields; and after the sender end receives the reply message, the information associated with the reply message is recorded in the corresponding wait-to-reply fields.

2. The message notice reply system of claim 1, wherein the message reply control entry comprises a time to reply, a reply address and a wait-to-reply/reply reminder field.

3. The message notice reply system of claim 1, wherein the message sent by the first message user agent comprises an audio/video document produced by an audio/video retrieving apparatus.

4. The message notice reply system of claim 1, wherein the message sent by the first message user agent comprises a dynamic description produced by a handwriting system.

5. The message notice reply system of claim 1, wherein the message sent by the first message user agent comprises a text, a scanned document, a retrieved screen, or a file, which may further include an audio/video document produced by an audio/video retrieving apparatus that is attached to the message, and a recorded dynamic description produced by a handwriting system.

6. The message notice reply system of claim 1, wherein the reply message produced by the second message user agent comprises an audio/video document produced by an audio/video retrieving apparatus.

7. The message notice reply system of claim 1, wherein the reply message produced by the second message user agent comprises a dynamic description produced by a handwriting system.

8. The message notice reply system of claim 1, wherein the reply message produced by the second message user agent comprises a text, a scanned document, a retrieved screen, or a file, which may further include an audio/video document produced by an audio/video retrieving apparatus that is attached to the message, and a recorded dynamic description produced by a handwriting system.

9. The message notice reply system of claim 1, wherein a reply reminder is issued within a specific time according to the message of the wait-to-reply field.

10. The message notice reply system of claim 9, wherein the reply reminder is transmitted to a telephone or a mobile phone via the network by a voice over internet protocol (VoIP) technology.

11. The message notice reply system of claim 1, wherein a reply reminder is issued within a specific time according to the message of the reply reminder field.

12. The message notice reply system of claim 1, wherein the message is created by a plurality of creating methods.

13. The message notice reply system of claim 12, wherein the creating method comprises creating a message through a combination of at least two of: a scanned document or a retrieved screen, an audio/video message, a handwriting message, a pure text message, a message produced by capturing a plurality of scan records, and a message produced by retrieving successive screens.

14. A message notice reply system, with a message reply mechanism having one or more message agents for providing a sender end and a recipient end with a message reply control entry, comprising:

a mail server providing a mail transfer agent for establishing a mail service over a network;

a sender's personal computer at the sender end having a first mail user agent for transmitting a message wherein when the message is transmitted, a message reply control entry is attached to the message, the first mail user agent defines one or more wait-to-reply fields displayed at first predetermined positions of an interface of the first mail user agent, and the wait-to-reply fields include a reply time, a respondent, a subject and a reply manner; and a recipient's personal computer at the recipient end having a second mail user agent, for receiving the message, transmitted from the first mail user agent, wherein when the second mail user agent parses the message from the first mail user agent and locates a presence of the message reply control entry the second mail user agent defines one or more reply reminder fields displayed at second predetermined positions of an interface of the second mail user agent, and the reply reminder fields include a reply time, a respondent, a subject and a reply manner;

wherein, after the second mail user agent replies a reply message information associated with the reply message is recorded in the corresponding reply reminder fields and the information associated with the reply message is recorded in the corresponding wait-to-reply fields upon a receipt of the reply message at the sender end.

15. The message notice reply system of claim 14, wherein the message reply control entry comprises a message time to reply, a reply address and a wait-to-reply/reply reminder field.

16. The message notice reply system of claim 14, wherein the interface of the first mail user agent further comprises a sender's mail sending area and a sender's mail receiving area.

17. The message notice reply system of claim 16, wherein the fields of the sender's mail sending area include a date/time, a message sender, a subject and a time to reply.

18. The message notice reply system of claim 16, wherein the field in the sender's mail receiving area comprises the wait-to-reply field.

19. The message notice reply system of claim 14, wherein the interface of the second mail user agent further comprises a recipient's mail receiving area and a recipient's reply area.

20. The message notice reply system of claim 19, wherein the fields of the recipient's mail receiving area comprises a date/time, a message sender, a subject and a time to reply.

21. The message notice reply system of claim 19, wherein the field of the recipient's reply area comprises the reply reminder field.

22. The message notice reply system of claim 14, wherein the message sent by the first message user agent comprises an audio/video document produced by an audio/video retrieving apparatus.

23. The message notice reply system of claim 14, wherein the message sent by the first message user agent comprises a dynamic description produced by a handwriting system.

24. The message notice reply system of claim 14, wherein the message sent by the first message user agent comprises a text, a scanned document, a retrieved screen, or a file, which may further include an audio/video document produced by an audio/video retrieving apparatus that is attached to the message, and a recorded dynamic description produced by a handwriting system.

25. The message notice reply system of claim 14, wherein the reply message produced by the second message user agent comprises an audio/video document produced by an audio/video retrieving apparatus.

26. The message notice reply system of claim 14, wherein the reply message produced by the second message user agent comprises a dynamic description produced by a handwriting system.

27. The message notice reply system of claim 14, wherein the reply message produced by the second message user agent comprises a text, a scanned document or a file, which may further include an audio/video document produced by an audio/video retrieving apparatus that is attached to the message, and a recorded dynamic description produced by a handwriting system.

28. The message notice reply system of claim 14, wherein a reply reminder is issued within a specific time according to the message of the wait-to-reply field.

29. The message notice reply system of claim 14, wherein a reply reminder is issued within a specific time according to the message of the reply reminder field.

30. The message notice reply system of claim 29, wherein the reply reminder is transmitted to a telephone or a mobile phone via the network by a voice over internet protocol (VoIP) technology.

31. The message notice reply system of claim 14, wherein the message is created by a plurality of creating methods.

32. The message notice reply system of claim 31, wherein the creating method comprises creating a message through a combination of at least two of: a scanned document, a retrieved screen, an audio/video message, a handwriting message, a pure text message, a message produced by capturing a plurality of scan records, and a message produced by retrieving successive screens.

33. A message notice reply method, comprising:

providing two personal computers, two mail servers, and a network interconnecting the personal computers and mail servers;

a message sending sub-procedure, including:

connecting a sender's personal computer having a first mail user agent installed at a sender end to a first mail server;

adding a message reply control entry to a message transmitted by the first mail user agent;

transmitting the message to a recipient through the first mail server;

storing a backup copy of the message; and adding one or more wait-to-reply fields including a reply date/time, a respondent, a subject and a reply manner;

a message receiving sub-procedure, including connecting a recipient's personal computer having a second mail user agent at a recipient end to a second mail server connected to the first mail server;

receiving the message;

parsing the message to locate a presence of the message reply control entry; and recording the message into the second message user agent adding one or more reply reminder fields including a reply date/time, a respondent, a subject and a reply manner;

a message reply sub-procedure, including:

connecting the second mail user agent to the second mail server; and sending a reply message;

recording information associated with the reply message in the reply reminder fields; and an acknowledge reply sub-procedure, including:

connecting the first mail user agent to the first mail server;

receiving the reply message;

parsing the reply message upon a receipt thereof; and recording the information associated with the reply message in the wait-to-reply fields.

34. The message notice reply method of claim 33, wherein the first outgoing mail server and the second outgoing mail server are outgoing mail servers in compliance with a simple mail transfer protocol (SMTP).

35. The message notice reply method of claim 33, wherein an online connection authorization procedure is executed when the first or second outgoing mail server is connected.

36. The message notice reply method of claim 33, wherein the added message reply control entry comprises a time to reply set by the sender.

37. The message notice reply method of claim 36, wherein the set time to reply is entered manually.

38. The message notice reply method of claim 36, wherein the set time to reply is set by selecting a default time from a menu.

39. The message notice reply method of claim 33, wherein the message reply control entry comprises a message time to reply, a reply address and a wait-to-reply/reply reminder field.

40. The message notice reply method of claim 33, wherein the first mail server and the second mail server are incoming mail servers in compliance with a POP3 or IMAP communication protocol.

41. The message notice reply method of claim 33, wherein an online connection authorization procedure is executed when the first or second mail server is connected.

42. The message notice reply method of claim 33, wherein the reply reminder is issued in a specific time according to the message of the reply reminder field.

43. The message notice reply method of claim 33, wherein the message sent by the sender includes an audio/video document produced by an audio/video retrieving apparatus.

44. The message notice reply method of claim 33, wherein the message sent by the sender includes a dynamic description produced by a handwriting system.

45. The message notice reply method of claim 33, wherein the message sent by the sender includes a text, a scanned document, a retrieved screen, or a file, which may further include an audio/video document produced by an audio/video retrieving apparatus that is attached to the message and a recorded dynamic description produced by a handwriting system.

46. The message notice reply method of claim 33, wherein the reply message created by the recipient includes an audio/video document produced by an audio/video retrieving apparatus.

47. The message notice reply method of claim 33, wherein the reply message created by the recipient includes a dynamic description produced by a handwriting system.

48. The message notice reply method of claim 33, wherein the reply message created by the recipient includes a text, a scanned document, a retrieved screen, or a file, which may further include an audio/video document produced by an audio/video retrieving apparatus that is attached to the message, and a recorded dynamic description produced by a handwriting system.

49. The message notice reply method of claim 33, wherein a reply reminder is issued within a specific time according to the message of the wait-to-reply field.

50. The message notice reply method of claim 49, wherein the reply reminder is transmitted to a telephone or a mobile phone via the network by a voice over internet protocol (VoIP) technology.

51. The message notice reply method of claim 33, wherein a reply reminder is issued within a specific time according to the message of the reply reminder field.

52. The message notice reply method of claim 33, wherein the wait-to-reply field is displayed at a side of the corresponding transmitted message.

53. The message notice reply method of claim 33, wherein the reply reminder field is displayed at a first predetermined position of an interface of the first mail user agent.

54. The message notice reply method of claim 33, wherein the creating method comprises creating a message through a scanned document, a retrieved screen, an audio/video message, a handwriting message, a pure text message, a message produced by capturing a plurality of scan records, a message produced by retrieving successive screens, or any combination of the above.

* * * * *